(12) United States Patent
Eckel et al.

(10) Patent No.: US 7,878,784 B2
(45) Date of Patent: Feb. 1, 2011

(54) INJECTION MOLDING MACHINE

(75) Inventors: Ulrich Eckel, Röttenbach (DE); Klaus Georg, Salz (DE); Gerhard Matscheko, Starnberg (DE); Georg Pengler, München (DE)

(73) Assignee: Siemens Aktiengesellschaft, Munich (DE)

( * ) Notice: Subject to any disclaimer, the term of this patent is extended or adjusted under 35 U.S.C. 154(b) by 212 days.

(21) Appl. No.: 12/286,757

(22) Filed: Oct. 1, 2008

(65) Prior Publication Data

US 2009/0087505 A1 Apr. 2, 2009

(30) Foreign Application Priority Data

Oct. 1, 2007 (EP) .................. 07019237

(51) Int. Cl.
*B29C 45/80* (2006.01)

(52) U.S. Cl. .......................................... 425/3

(58) Field of Classification Search ............... 425/149, 425/150, 3
See application file for complete search history.

(56) References Cited

U.S. PATENT DOCUMENTS

| 4,895,505 A | 1/1990 | Inaba et al. | |
| 6,051,896 A * | 4/2000 | Shibuya et al. | 425/3 |
| 2004/0071810 A1 | 4/2004 | Hsu et al. | |
| 2004/0161485 A1 | 8/2004 | Kobayashi | |
| 2005/0147704 A1 | 7/2005 | Ickinger et al. | |

FOREIGN PATENT DOCUMENTS

| DE | 102 13 679 A1 | 10/2003 |
| DE | 10 2005 007 747 B3 | 5/2006 |
| EP | 1 813 412 A1 | 8/2007 |
| JP | 60132721 A | 7/1985 |

OTHER PUBLICATIONS

2004 J 00944 (Siemens-Veröffentlchung): "Antrieb einer Kunststoffspritzgussmaschine mit nur einem Motor"; 2004; p. 1-2 Siemens AG.

* cited by examiner

*Primary Examiner*—Tim Heitbrink

(57) ABSTRACT

An injection molding machine is provided. Permanent magnets are attached to a planetary roller spindle and/or ball screw spindle or to the spindle nut of the injection molding machine. Thus, the permanent magnets are integrated into the planetary roller spindle and/or ball screw spindle or to the spindle nut of the injection molding machine.

3 Claims, 1 Drawing Sheet

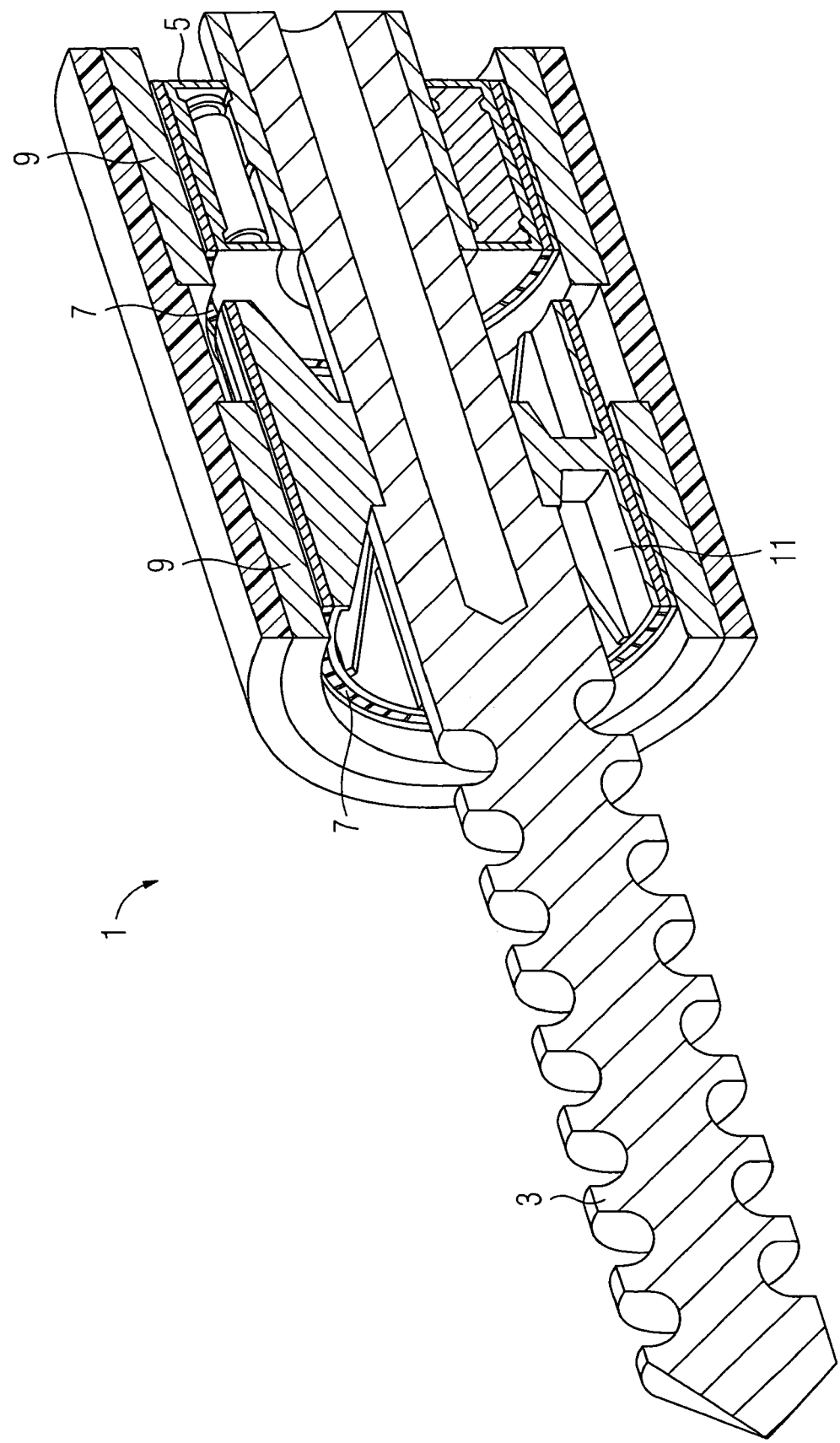

INJECTION MOLDING MACHINE

CROSS REFERENCE TO RELATED APPLICATIONS

This application claims priority of European Patent Office application No. 07019237.2 EP filed Oct. 1, 2007, which is incorporated by reference herein in its entirety.

FIELD OF INVENTION

The present invention relates to an injection molding machine.

BACKGROUND OF INVENTION

Torque motors (gearless direct drive system with high torque) with a hollow shaft are frequently deployed with electric injection molding machines.

With these the motor rotors necessarily have large mass inertia moments. Electric injection molding machines necessarily require a highly dynamic drive system for the technological process as well as a "high-resolution" cycle time for production, in order to be able to manufacture parts cleanly.

In electric injection molding machines at present according to the prior art the required high dynamic is achieved by installing major drive power systems. This means for example at the injection axis that to achieve acceleration times, the installed electric power and/or the available torque is predominantly (>90%) used to accelerate the rotating motor rotor part.

SUMMARY OF INVENTION

With hollow shaft motors in particular the mass inertia of the motors or spindles has an impact. During acceleration of the axes to some extent more energy has to be deployed in the rotation of the motor/spindle combination than in the linear movement of the axis. This is particularly significant for the injection axis. Electric machines have still not yet achieved the speeds and accelerations of hydraulic solutions in this respect.

One object of the present invention is therefore to reduce the mass inertia moments in the drive train, in other words the rotating motor parts and/or the rotating parts of the injection molding machine, so that even thin-walled parts in particular can be injection-molded without any problems with reduced installed drive power and reduced available torque compared with the prior art.

To reduce the mass inertia moment in the drive train of the injection molding machine, it is proposed that the required permanent magnets (which are originally assigned to the motor rotor in the prior art) and the mechanically necessary planetary roller spindle or ball screw spindle should be designed as an integrated, compact, mechatronic component.

Attaching the permanent magnets directly to the thus modified spindles of the injection molding machine reduces both the masses and the diameter of the rotating parts. The acceleration values that can thus be achieved then increase quadratically in relation to the (reduced) radius of the motor rotor (which now no longer has to contain permanent magnets). The permanent magnets can hereby be attached to the planetary roller spindle or ball screw spindle or to a spindle nut.

There is then no need for the hollow shaft at the torque motor in contrast to the prior art. The permanent magnets (previously built onto the hollow shaft) create the magnetic circuit on the spindle or on the spindle nut. A torque/spindle motor for injection molding machines results.

Therefore when the inventive concept is applied to the electric injection molding machine, acceleration values are achieved, with which even thin-walled parts can be injection-molded without any problems, without the plastic setting when the liquid plastic enters the cold mold.

The invention thus delivers an injection molding machine, in which permanent magnets are attached to a planetary roller spindle or ball screw spindle of the injection molding machine or to the spindle nut. This produces the particular effect that with a smaller installed drive power of the injection molding machine compared with injection molding machines from the prior art it is still possible to achieve the same or even better acceleration values, which are required to injection-mold the above-mentioned thin-walled parts in particular without any problems.

Regardless of the technical field of injection molding servomotors are known from the prior art, whose permanent magnets are adhered to the rotating spindle nut. However until now it has only been known to date that this measure can be used to improve load distribution and achieve a longer operating life. Such motors are also only known for performance classes, which appear irrelevant/technically not feasible for deployment in injection molding machines, as significantly greater drive powers are required here, as mentioned above in the introduction. The knowledge that by integrating the permanent magnets in the planetary roller spindle or ball screw spindle or in the spindle nut of the injection molding machine it is possible to reduce the required drive power and lower-power motors can then also be considered as already part of the inventive perception and should not be assigned to the prior art.

The major electric power systems generally installed in injection molding machines in the prior art can now be reduced significantly due to the inventive reduction of mass inertia. This is of enormous benefit for the technologically required dynamic in injection molding machines. The now adequate reduced drive power also means lower investment costs for the injection molding machine. It can now be designed smaller for example. Also it is easier to replace the motor, for example during a repair, as the motor can be much smaller. Also it is generally simpler and more cost-effective to equip smaller motors with a sensor system.

BRIEF DESCRIPTION OF THE DRAWINGS

The FIGURE shows an exemplary embodiment of the invention in more detail.

The FIGURE shows essential components of an inventive injection molding machine.

DETAILED DESCRIPTION OF INVENTION

The FIGURE shows essential drive components of an inventive injection molding machine 1.

The injection molding machine comprises a screw 3, a planetary nut 5 and plasticizing rotor 11.

Permanent magnets 7 are hereby attached directly to an outer circumference of the planetary nut 5. Furthermore the plasticizing rotor 11 here likewise comprises permanent magnets 7, which are attached to an outer circumference of said rotor 11.

A stator 9 of the injection molding machine encloses the planetary nut 5 and the plasticizing rotor 11. The stator 9 here can be divided into two segments and have a gap between the plasticizing rotor 11 and the planetary nut 5.

These measures mean that an inventive injection molding machine has a significantly reduced mass inertia compared with the prior art. The drive dynamic is improved and motors with comparatively less power can now be inventively deployed.

The invention claimed is:

1. An injection molding machine, comprising:
a screw;
a planetary nut with an opening to receive the spindle;
a rotor with an opening to receive the screw;
a plurality of permanent magnets, at least one permanent magnet directly attached to an outer circumference of the planetary nut and at least one permanent magnet directly attached to an outer circumference of the rotor, said rotor and planetary nut being separated by a gap.

2. The injection molding machine of claim 1, wherein said attachment of the permanent magnets to the respective outer circumferences of the planetary nut and the rotor is configured to reduce the moment of inertia of the injection molding machine.

3. The injection molding machine of claim 1, further comprising a stator configured to enclose the spindle nut and the rotor.

* * * * *